(12) United States Patent
Torita et al.

(10) Patent No.: US 11,437,690 B2
(45) Date of Patent: Sep. 6, 2022

(54) NONAQUEOUS BATTERY AND METHOD OF PRODUCING THE SAME

(71) Applicant: TOYOTA JIDOSHA KABUSHIKI KAISHA, Toyota (JP)

(72) Inventors: Koji Torita, Nagoya (JP); Akihiro Ochiai, Toyonaka (JP); Yusuke Fukumoto, Toyonaka (JP); Harunari Shimamura, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 15/963,658

(22) Filed: Apr. 26, 2018

(65) Prior Publication Data

US 2018/0315985 A1 Nov. 1, 2018

(30) Foreign Application Priority Data

May 1, 2017 (JP) .............................. JP2017-091097

(51) Int. Cl.
*H01M 50/572* (2021.01)
*H01M 4/13* (2010.01)
(Continued)

(52) U.S. Cl.
CPC ....... *H01M 50/572* (2021.01); *H01M 4/0404* (2013.01); *H01M 4/13* (2013.01);
(Continued)

(58) Field of Classification Search
CPC .... H01M 2/34; H01M 4/667; H01M 10/4235; H01M 4/0404; H01M 4/13; H01M 4/139;
(Continued)

(56) References Cited

U.S. PATENT DOCUMENTS

| 2004/0106042 A1 | 6/2004 | Asari et al. |
| 2010/0119932 A1* | 5/2010 | Nakura ................. H01M 2/348 |
| | | 429/163 |

(Continued)

FOREIGN PATENT DOCUMENTS

| JP | 2000-149924 A | 5/2000 |
| JP | 2003-197182 A | 7/2003 |

(Continued)

OTHER PUBLICATIONS

John D. Milliman et al., "Peak height versus peak intensity analysis of X-ray diffraction data", Sedimentology, vol. 20, No. 3, Aug. 1, 1973, pp. 445-448 (4 pages total).

(Continued)

*Primary Examiner* — Helen Oi K Conley
(74) *Attorney, Agent, or Firm* — Sughrue Mion, PLLC

(57) ABSTRACT

A nonaqueous battery includes a positive electrode and a negative electrode. At least one of the positive electrode and the negative electrode includes a current collector, an intermediate layer, and an active material layer. The intermediate layer is interposed between the current collector and the active material layer and includes graphite particles and insulating particles. In a cross section of the intermediate layer in a thickness direction, a major axis diameter of the graphite particles is equal to or greater than the thickness of the intermediate layer. In X-ray diffraction measurement of the intermediate layer by an out-of-plane method, a ratio of an intensity of an 110 diffraction line of a graphite crystal to an intensity of a 002 diffraction line of the graphite crystal is 0.0011 or more.

19 Claims, 8 Drawing Sheets

(51) Int. Cl.
| | |
|---|---|
| *H01M 10/054* | (2010.01) |
| *H01M 10/0525* | (2010.01) |
| *H01M 10/052* | (2010.01) |
| *H01M 10/42* | (2006.01) |
| *H01M 4/04* | (2006.01) |
| *H01M 4/66* | (2006.01) |
| *H01M 4/139* | (2010.01) |
| *H01M 4/131* | (2010.01) |
| *H01M 4/133* | (2010.01) |
| *H01M 4/1393* | (2010.01) |
| *H01M 4/1391* | (2010.01) |

(52) U.S. Cl.
CPC ........... *H01M 4/139* (2013.01); *H01M 4/667* (2013.01); *H01M 10/052* (2013.01); *H01M 10/054* (2013.01); *H01M 10/0525* (2013.01); *H01M 10/4235* (2013.01); *H01M 4/131* (2013.01); *H01M 4/133* (2013.01); *H01M 4/1391* (2013.01); *H01M 4/1393* (2013.01)

(58) Field of Classification Search
CPC .... H01M 4/131; H01M 4/133; H01M 10/052; H01M 10/0525; H01M 10/054
See application file for complete search history.

(56) References Cited

U.S. PATENT DOCUMENTS

| | | | |
|---|---|---|---|
| 2014/0134492 A1* | 5/2014 | Yamami | H01M 4/366 |
| | | | 429/223 |
| 2016/0093922 A1 | 3/2016 | Endo et al. | |
| 2016/0254545 A1* | 9/2016 | Sugita | H01M 4/62 |
| | | | 429/233 |

FOREIGN PATENT DOCUMENTS

| | | |
|---|---|---|
| JP | 2013131297 A | 7/2013 |
| JP | 2016-072221 A | 5/2016 |

OTHER PUBLICATIONS

Zhou Jian et al., "The Physical Meanings of 5 Basic Parameters for an X-Ray Diffraction Peak and Their Application", Chinese Journal of Geochemistry, vol. 22, No. 1, Jan. 1, 2003, pp. 38-44 (7 pages total).

* cited by examiner

RELATED ART

NONAQUEOUS BATTERY AND METHOD OF PRODUCING THE SAME

INCORPORATION BY REFERENCE

The disclosure of Japanese Patent Application No. 2017-091097 filed on May 1, 2017 including the specification, drawings and abstract is incorporated herein by reference in its entirety.

BACKGROUND

1. Technical Field

The present disclosure relates to a nonaqueous battery and a method of producing the same.

2. Description of Related Art

Japanese Unexamined Patent Application Publication No. 2016-072221 (JP 2016-072221 A) discloses an intermediate layer that is formed between a current collector and an active material layer. The intermediate layer contains insulating particles such as diamond particles.

SUMMARY

Nail penetration is known as one of abnormal states of a nonaqueous battery (hereinafter abbreviated as a "battery" in some cases). "Nail penetration" is an abnormal state in which a conductive foreign substance having a sharp tip such as a nail penetrates a battery. In this specification, the conductive foreign substance is referred to as a "nail" for convenience.

When nail penetration occurs, short circuiting is thought to occur between a positive electrode and a negative electrode through a nail. That is, a short-circuit current is thought to flow in the nail. It is thought that Joule heat is generated due to the short-circuit current and the battery generates heat. In addition, due to an impact when the nail penetrates an electrode (a positive electrode or a negative electrode), an active material layer can peel off from a current collector, and the current collector can be exposed. The current collector has low electrical resistance. Thus, when the current collector comes in contact with a counter electrode, it is thought that a large short-circuit current flows, and an amount of heat generated is larger.

In JP 2016-072221 A, an intermediate layer is formed between the active material layer and the current collector. The intermediate layer contains insulating particles. Even if the active material layer peels off during nail penetration, since the intermediate layer protects the current collector, short circuiting between the current collector and the counter electrode is expected to be prevented.

However, the intermediate layer needs to have a certain degree of conductivity. When the electrical resistance of the intermediate layer is high, conduction between the active material layer and the current collector becomes insufficient, and there is a possibility of a battery capacity decreasing. Therefore, the intermediate layer in JP 2016-072221 A contains carbon black as a conductive material in addition to the insulating particles.

Since the intermediate layer has conductivity, there is a possibility of a short-circuit current flowing in an in-plane direction of the intermediate layer during nail penetration. The "in-plane direction" refers to an arbitrary direction that is orthogonal to a thickness direction of the intermediate layer. When a short-circuit current flows in an in-plane direction of the intermediate layer, it is thought that a larger short-circuit current flows in the nail and there is greater Joule heat.

The present disclosure provides a nonaqueous battery that can prevent a short-circuit current during nail penetration.

The technical configuration and operations and effects of the present disclosure will be described below. However, the following description does not limit the scope of the claims.

A first aspect of the present disclosure is a nonaqueous battery. The nonaqueous battery includes at least a positive electrode and a negative electrode. At least one of the positive electrode and the negative electrode includes a current collector, an intermediate layer, and an active material layer. The intermediate layer is interposed between the current collector and the active material layer. The intermediate layer includes graphite particles and insulating particles. In a cross section of the intermediate layer in a thickness direction, a major axis diameter of the graphite particles is equal to or greater than the thickness of the intermediate layer. In X-ray diffraction measurement of the intermediate layer by an out-of-plane method, a ratio of an intensity of the 110 diffraction line of a graphite crystal to an intensity of the 002 diffraction line of the graphite crystal is 0.0011 or more.

The intermediate layer of the present disclosure includes graphite particles as a conductive material. The graphite particles include a graphite crystal. The graphite crystal has a structure in which basal planes (hexagonal carbon net surfaces) are laminated. A direction (a direction perpendicular to the basal plane) in which basal planes are laminated is also referred to as a c axis direction. The graphite crystal has anisotropy in conductivity. That is, a current is likely to flow in a direction parallel to the basal plane, and a current is unlikely to flow in the c axis direction.

In the intermediate layer of the present disclosure, graphite particles are aligned so that the basal plane is in the thickness direction of the intermediate layer. Thus, it is thought that a current is likely to flow in the thickness direction of the intermediate layer, that is, in a direction from the current collector to the active material layer, and a current is unlikely to flow in the in-plane direction of the intermediate layer.

An alignment state of graphite particles in the intermediate layer is evaluated by a ratio of an intensity of the 110 diffraction line of a graphite crystal to an intensity of the 002 diffraction line of the graphite crystal (hereinafter referred to as an "XRD intensity ratio") in X-ray diffraction (XRD) measurement. When the XRD intensity ratio is 0.0011 or more, a current flowing in the intermediate layer in the in-plane direction during nail penetration can be sufficiently low. That is, a short-circuit current during nail penetration can be prevented. Thus, an amount of heat generated in the battery is expected to be reduced.

However, the major axis diameter of graphite particles is equal to or greater than the thickness of the intermediate layer or more. The "major axis diameter" in this specification indicates the largest diameter of graphite particles in the cross section of the intermediate layer in the thickness direction. The "cross section in the thickness direction" indicates a cross section parallel to the intermediate layer in the thickness direction. The major axis of graphite particles and the basal plane are assumed to be substantially parallel. When the major axis diameter is less than the thickness of the intermediate layer, conduction between the current collector and the active material layer may be insufficient. This is thought to be caused by the fact that it is not possible for one graphite particle to come into contact with both the current collector and the active material layer.

In the first aspect, in a cross section of the intermediate layer in the thickness direction, a ratio of the major axis diameter of graphite particles to the minor axis diameter of the graphite particles may be 2 or more. The "minor axis diameter" in this specification indicates the largest diameter among diameters orthogonal to the major axis diameter of the graphite particles in the cross section of the intermediate layer in the thickness direction. Hereinafter, a ratio of the major axis diameter to the minor axis diameter will be referred to as an "aspect ratio." When the aspect ratio is 2 or more, a current flowing in the intermediate layer in the in-plane direction during nail penetration is expected to be lowered.

In the first aspect, in the cross section of the intermediate layer in the thickness direction, the major axis diameter of the graphite particles may be twice the thickness of the intermediate layer or less. Accordingly, a current flowing in the intermediate layer in the in-plane direction during nail penetration is expected to be lowered.

In the first aspect, in the X-ray diffraction measurement of the intermediate layer by the out-of-plane method, the ratio of the intensity of the 110 diffraction line of the graphite crystal to the intensity of the 002 diffraction line of the graphite crystal may be 0.0018 or more. Accordingly, a current flowing in the intermediate layer in the in-plane direction during nail penetration is expected to be lowered.

In the first aspect, in the X-ray diffraction measurement of the intermediate layer by the out-of-plane method, the ratio of the intensity of the 110 diffraction line of the graphite crystal to the intensity of the 002 diffraction line of the graphite crystal may be 0.0029 or more. Accordingly, a current flowing in the intermediate layer in the in-plane direction during nail penetration is expected to be lowered.

In the first aspect, in the intermediate layer, a mass proportion of the insulating particles may be higher than a mass proportion of the graphite particles. Accordingly, a current flowing in the intermediate layer in the in-plane direction during nail penetration is expected to be lowered.

A second aspect of the present disclosure is a nonaqueous battery. The nonaqueous battery includes at least a positive electrode and a negative electrode. At least one of the positive electrode and the negative electrode includes a current collector, an intermediate layer, and an active material layer. The intermediate layer is interposed between the current collector and the active material layer. The intermediate layer includes graphite particles and insulating particles. In a cross section of the intermediate layer in a thickness direction of the intermediate layer, a length of the graphite particles is equal to or greater than a thickness of the intermediate layer. In the in-plane direction perpendicular to the thickness direction, the insulating particles are disposed between the graphite particles, and the plurality of insulating particles are continuously disposed between the current collector and the active material layer.

A third aspect of the present disclosure is a method of producing a nonaqueous battery. The method includes (A) to (C): (A) producing a positive electrode, (B) producing a negative electrode, and (C) producing a nonaqueous battery that includes at least a positive electrode and a negative electrode.

At least one of (A) producing a positive electrode and (B) producing a negative electrode includes the following (a) to (e): (a) preparing a paint including graphite particles and insulating particles, (b) forming a coating by applying the paint to a surface of a current collector, (c) aligning the graphite particles by applying a magnetic field to the coating in a thickness direction before the coating is dried, (d) forming an intermediate layer by drying the coating in which the graphite particles are aligned, and (e) forming an active material layer on a surface of the intermediate layer.

In X-ray diffraction measurement of the intermediate layer by an out-of-plane method, a ratio of an intensity of the 110 diffraction line of a graphite crystal to an intensity of the 002 diffraction line of the graphite crystal is 0.0011 or more.

In the third aspect of the present disclosure, a viscosity of the paint may be 10 mPa·s to 3,000 mPa·s.

As described above, when a magnetic field is applied before the coating is dried, the graphite particles can be aligned. This is because the coating before drying has fluidity. The coating is cured (dried) while the graphite particles are aligned. Thereby, the intermediate layer can have anisotropy in electrical resistance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
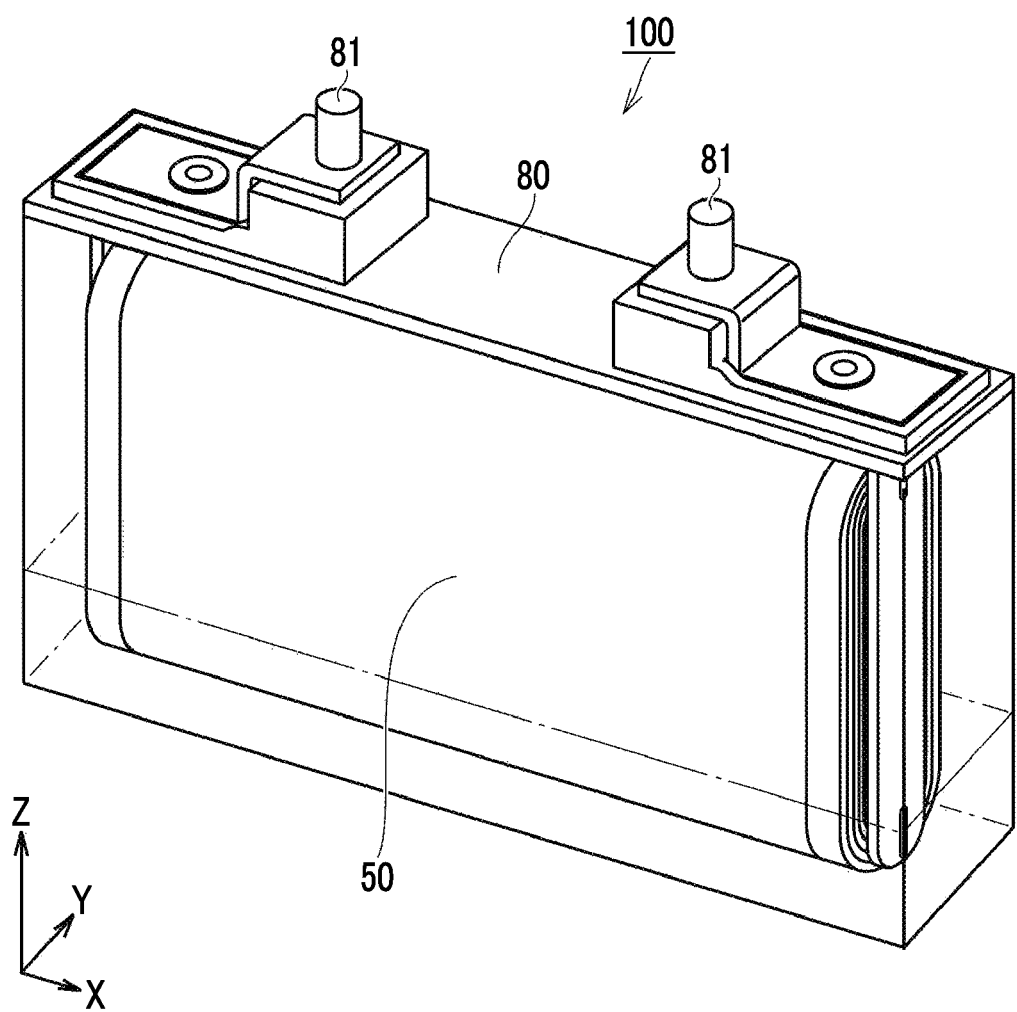
FIG. 1 is a schematic diagram showing an example of a configuration of a nonaqueous battery of the present embodiment.

Embodiments (referred to as "the present embodiment" in this specification) of the present disclosure will be described below. However, the following description does not limit to the scope of the appended claims.

As an example of a nonaqueous battery, a lithium ion secondary battery will be described below. However, a lithium ion secondary battery is only an example. The nonaqueous battery of the present embodiment is not limited to a lithium ion secondary battery. The nonaqueous battery of the present embodiment may be, for example, a lithium primary battery or a sodium ion secondary battery.

In the drawings of this specification, for convenience of explanation, sizes are appropriately changed. The sizes in the drawings of this speciation do not reflect actual sizes. In addition, "parallel," "orthogonal" and "perpendicular" in this specification do not indicate that components are completely "parallel," "orthogonal," and "perpendicular" in a geometrical sense. "Parallel," "orthogonal," and "perpendicular" in this specification include ranges that can be substantially regarded as "parallel," "orthogonal," and "perpendicular." For example, when an angle between a certain direction and a certain surface is 0°±3°, the certain direction and the certain surface may be regarded as being substantially "parallel."

In this specification, for example, "at least one of A and B" includes "only A," "only B," and "both A and B."

<Nonaqueous Battery>

A nonaqueous battery in this specification indicates a battery that does not contain water in an electrolyte. FIG. 1 is a schematic diagram showing an example of a configuration of a nonaqueous battery of the present embodiment. A battery 100 includes a case 80. The case 80 is sealed. The case 80 has a rectangular shape (flat rectangular parallelepiped shape). However, the battery of the present embodiment is not limited to a rectangular battery. The battery of the present embodiment may be a cylindrical battery, a laminated battery, or a coin battery.

The case 80 may be made of, for example, an aluminum (Al) alloy, iron (Fe), stainless steel (SUS), or a resin. The case 80 may be made of, for example, a composite material of a metal and a resin (for example, a bag made of an aluminum laminate film). The case 80 includes a terminal 81. A current interruption mechanism (CID), a gas exhaust valve, an injection hole, and the like may be provided in the case 80.

An electrode group 50 and an electrolyte solution are accommodated in the case 80. A part of the electrolyte solution is impregnated into the electrode group 50. A part of the electrolyte solution accumulates on the bottom of the case 80. A dashed line in FIG. 1 indicates a liquid level of the electrolyte solution. The electrode group 50 is electrically connected to the terminal 81.

Figure 2:
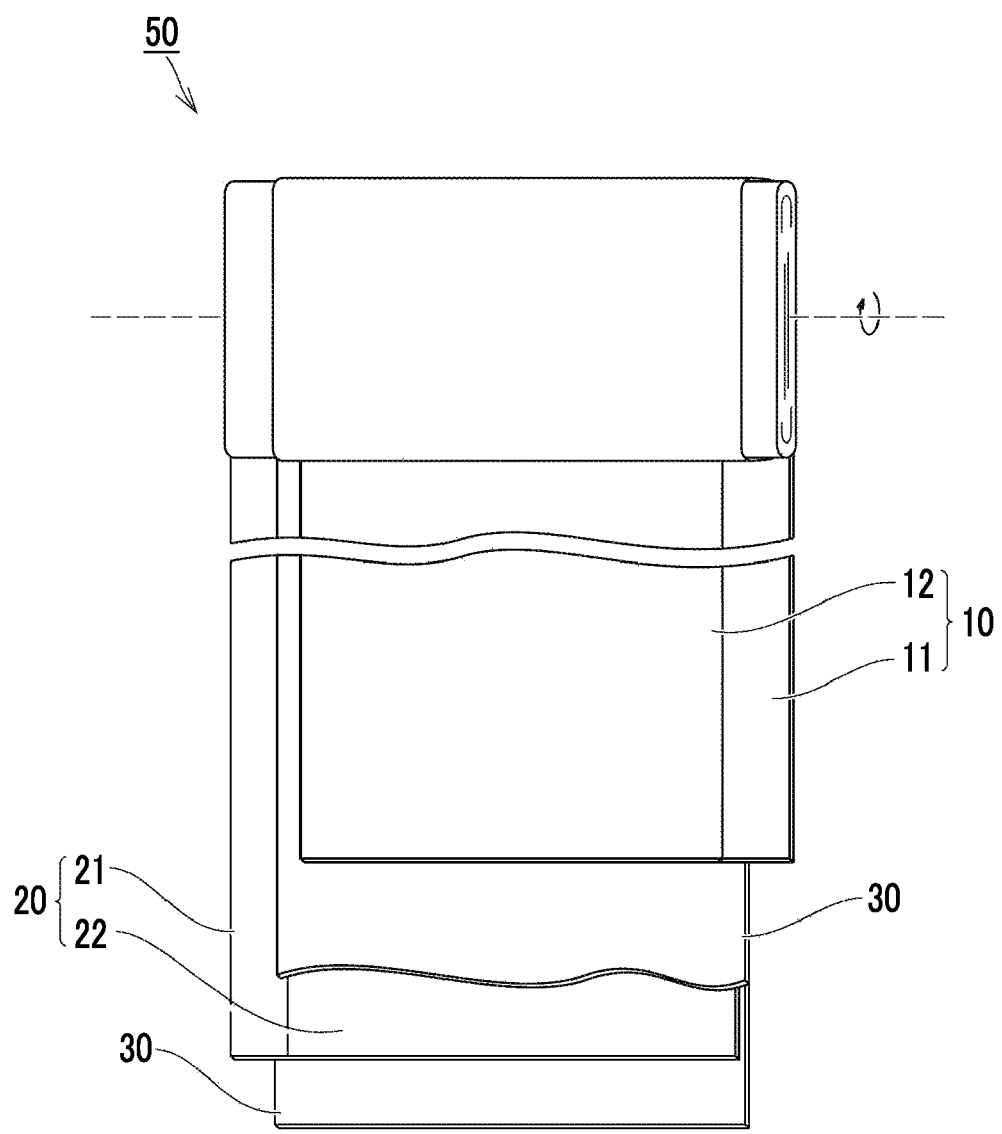
FIG. 2 is a schematic diagram showing an example of a configuration of an electrode group of the present embodiment.

FIG. 2 is a schematic diagram showing an example of a configuration of an electrode group of the present embodiment. The electrode group 50 includes a positive electrode 10, a separator 30, and a negative electrode 20. That is, the battery 100 includes at least the positive electrode 10 and the negative electrode 20. The electrode group 50 is a wound electrode group. That is, the electrode group 50 is formed by laminating the positive electrode 10, the separator 30, the negative electrode 20 and the separator 30 in that order and additionally winding them in a spiral shape. The electrode group of the present embodiment may be a laminated electrode group. The laminated electrode group may be formed by alternately laminating positive electrodes and negative electrodes with separators therebetween.

The positive electrode 10 includes a positive electrode current collector 11 and a positive electrode active material layer 12. The negative electrode 20 includes a negative electrode current collector 21 and a negative electrode active material layer 22. In the present embodiment, at least one of the positive electrode 10 and the negative electrode 20 further includes an intermediate layer. That is, at least one of the positive electrode 10 and the negative electrode 20 includes the current collector (the positive electrode current collector 11, the negative electrode current collector 21), the intermediate layer, and the active material layer (the positive electrode active material layer 12, the negative electrode active material layer 22). In this specification, as an example, a case in which the positive electrode 10 includes the intermediate layer will be described.

<Intermediate Layer>

Figure 3:
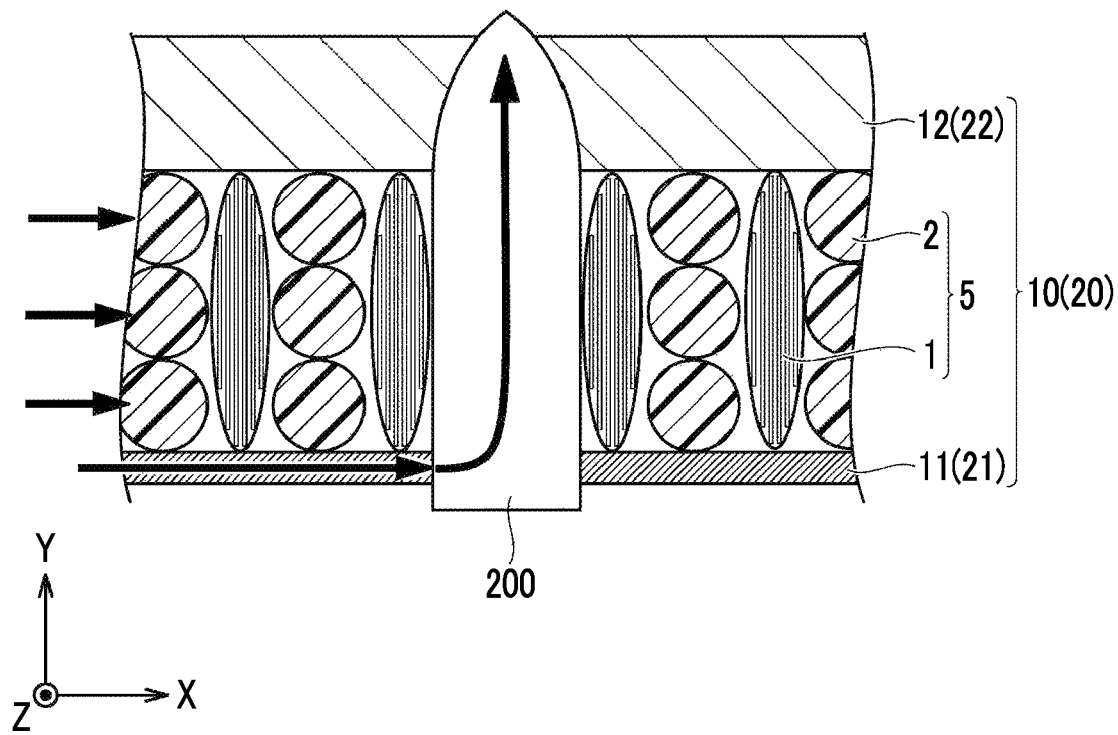
FIG. 3 is a conceptual sectional view showing an intermediate layer of the present embodiment.

FIG. 3 is a conceptual sectional view showing an intermediate layer of the present embodiment. In FIG. 3, a cross section of an intermediate layer 5 in a thickness direction is conceptually shown. The intermediate layer 5 is interposed between the current collector (the positive electrode current collector 11) and the active material layer (the positive electrode active material layer 12). The intermediate layer 5 contains graphite particles 1 and insulating particles 2 which are an insulating material.

Figure 4:
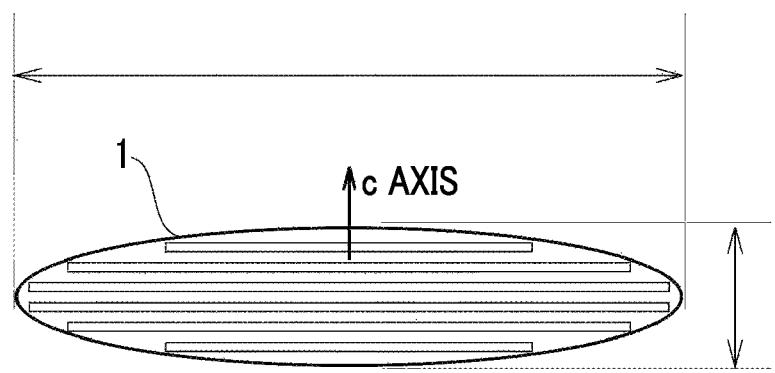
FIG. 4 is a conceptual sectional view showing graphite particles.

FIG. 4 is a conceptual sectional view showing graphite particles. The graphite particles 1 have a structure in which basal planes are laminated. A current easily flows in a direction parallel to the basal plane. It is difficult for a current to flow in a direction (c axis direction) in which basal planes are laminated. The major axis diameter indicates the largest diameter of the graphite particles 1 in the cross section of the intermediate layer 5 in the thickness direction. The major axis diameter is considered to be substantially parallel to the basal plane. The largest diameter among diameters orthogonal to the major axis diameter is the minor axis diameter.

As shown in FIG. 3, the graphite particles 1 are aligned so that the basal plane is in the thickness direction (a Y axis direction in FIG. 3) of the intermediate layer 5. In other words, the graphite particles 1 are aligned so that the c axis is in an in-plane direction (an X axis direction in FIG. 3) of the intermediate layer 5. The graphite particles 1 have a major axis diameter with a length that is equal to or greater than the thickness of the intermediate layer 5. The insulating particles 2 fill between the graphite particles 1. In other words, the graphite particles 1 have a length that is equal to or greater than the thickness of the intermediate layer 5, the insulating particles 2 are disposed between the graphite particles 1 in the in-plane direction perpendicular to the thickness direction of the intermediate layer 5, and the plurality of insulating particles 2 are continuously disposed between the current collector and the active material layer. Here, for convenience of explanation, in FIG. 3, the major axis diameter of the graphite particles 1 is drawn parallel to the thickness direction of the intermediate layer 5. The major axis diameter is thought to be actually inclined to some extent with respect to the thickness direction.

When the nail 200 penetrates the positive electrode 10, a current flows from the positive electrode current collector 11 to a nail 200. However, since the graphite particles 1 are aligned, a current is unlikely to flow in the in-plane direction of the intermediate layer 5. As a result, a short-circuit current flowing in the nail 200 is reduced and heat generation of the battery 100 can be reduced.

Figure 5:
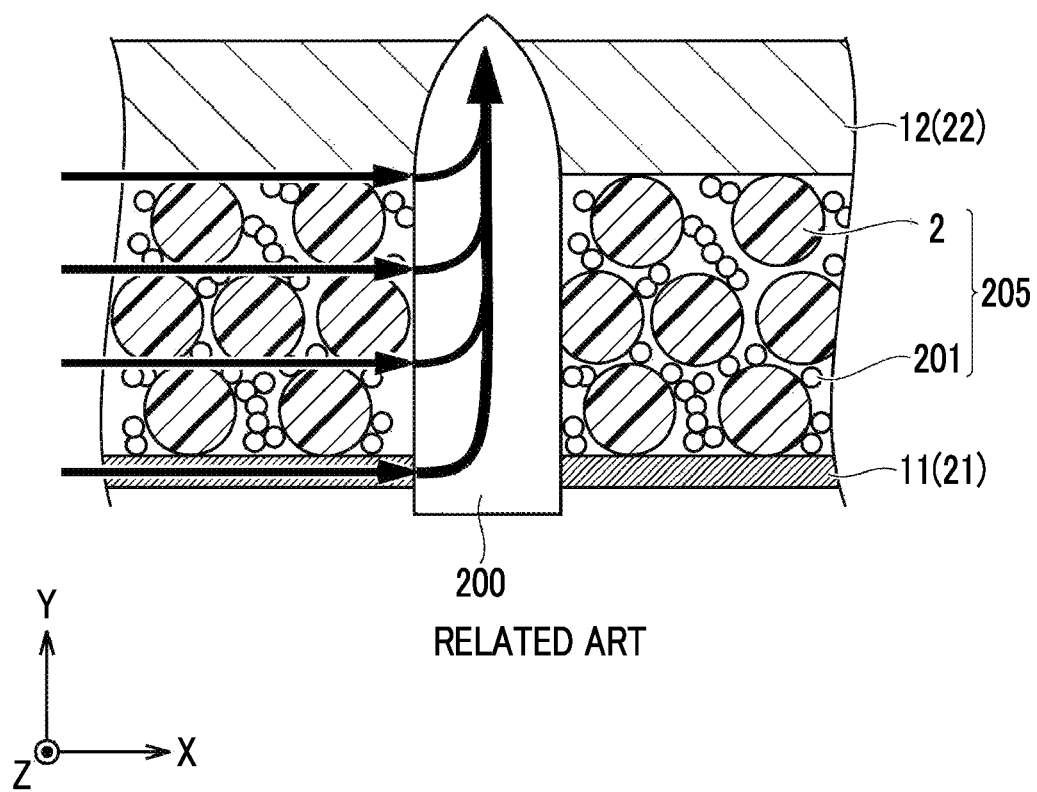
FIG. 5 is a conceptual sectional view showing an intermediate layer of a reference form.

FIG. 5 is a conceptual sectional view showing an intermediate layer of a reference form. An intermediate layer 205 according to the reference form contains carbon black 201 and the insulating particles 2. It is thought that the carbon black 201 has no anisotropy in electrical resistance. When the nail 200 penetrates the positive electrode 10, a current flows from the positive electrode current collector 11 to the nail 200. In addition, a current flows in the in-plane direction of the intermediate layer 205 through the carbon black 201, and the current flows into the nail 200. Thus, a short-circuit current flowing in the nail 200 is thought to increase and Joule heat is also thought to increase.

(XRD Intensity Ratio)

An alignment state of the graphite particles 1 is evaluated according to an XRD intensity ratio. An XRD pattern is measured while the positive electrode active material layer 12 is peeled off from the intermediate layer 5. The measurement is performed by an out-of-plane method. The "out-of-plane method" is a method of evaluating a lattice plane parallel to a surface of a sample (the intermediate layer 5). Here, a method of evaluating a lattice plane perpendicular to a surface of a sample is referred to as an "in-plane method."

In the XRD pattern, the 002 diffraction line of a graphite crystal is thought to appear around a diffraction angle (2θ)=26° to 27°. The 110 diffraction line of a graphite crystal is thought to appear around 2θ=77° to 78°. In the present embodiment, a ratio of an intensity of the 110 diffraction line to an intensity of the 002 diffraction line (XRD intensity ratio) is 0.0011 or more.

That is, in XRD measurement of the intermediate layer by the out-of-plane method, a ratio of an intensity of the 110 diffraction line of a graphite crystal to an intensity of the 002 diffraction line of the graphite crystal is 0.0011 or more. Thus, the graphite particles 1 are sufficiently aligned, and a current flowing in the in-plane direction of the intermediate layer 5 can be sufficiently low during nail penetration. The XRD intensity ratio may be 0.0018 or more or 0.0029 or more. Thus, a current flowing in the intermediate layer 5 during nail penetration is expected to be lowered. The upper limit of the XRD intensity ratio is not particularly limited. The XRD intensity ratio may be, for example, 0.01 or less.

(Thickness of Intermediate Layer)

When the intermediate layer 5 is excessively thick, there is a possibility of a volumetric energy density of the battery 100 decreasing. The intermediate layer 5 may have, for example, a thickness of 1 μm or more and 5 μm or less. The intermediate layer 5 may have a thickness of 1 μm or more and 3 μm or less or a thickness of 3 μm or more and 5 μm or less. The thickness of each component in this specification can be measured in a cross-sectional microscope image of each component. The microscope may be an optical microscope or an electron microscope. In the cross-sectional microscope image, the thickness can be measured at least three parts. An arithmetic mean of the thicknesses of at least three parts can be used as a measurement result.

(Electrical Resistance)

The intermediate layer 5 may have anisotropy in electrical resistance. The electrical resistance of the intermediate layer 5 in the in-plane direction may be, for example, 5,000 mΩ or more, 7,000 mΩ or more, 8,500 mΩ or more, 9,000 mΩ or more, or 10,000 mΩ or more. The electrical resistance of the intermediate layer 5 in the in-plane direction may be, for example, 11,000 mΩ or less.

The electrical resistance of the intermediate layer 5 in the thickness direction may be, for example, 13 mΩ or less, 11 mΩ or less, or 10 mΩ or less. The electrical resistance of the intermediate layer 5 in the thickness direction may be, for example, 5 mΩ or more.

In the intermediate layer 5, a ratio of the electrical resistance in the in-plane direction to the electrical resistance in the thickness direction may be, for example, 700 or more, 850 or more, or 1,000 or more. In the intermediate layer 5, a ratio of the electrical resistance in the in-plane direction to the electrical resistance in the thickness direction may be, for example, 1,700 or less. Here, a method of measuring the electrical resistance of the intermediate layer is shown in the following examples.

(Graphite Particles)

The intermediate layer 5 may contain, for example, 3 mass % or more and 10 mass % or less of the graphite particles 1, or 3 mass % or more and 7 mass % or less of the graphite particles 1. In the cross section of the intermediate layer 5 in the thickness direction, the graphite particles 1 have a major axis diameter that is 1 times the thickness of the intermediate layer 5 or more. The major axis diameter, the minor axis diameter, and the aspect ratio of the graphite particles 1 can be measured in the cross-sectional microscope image of the intermediate layer 5. The microscope here is typically a scanning electron microscope (SEM). First, an SEM image (cross-sectional SEM image) of the cross section of the intermediate layer 5 in the thickness direction is acquired. It is desirable that noise in the cross-sectional SEM image be appropriately removed or reduced by image processing. In the cross-sectional SEM image, 20 graphite particles are randomly extracted. In the graphite particles, the major axis diameter, the minor axis diameter, and the aspect ratio are measured. The major axis diameter, the minor axis diameter, and the aspect ratio of the present embodiment are arithmetic means of 20 graphite particles.

When the major axis diameter is excessively large, it may be difficult to form the thin intermediate layer 5. In the cross section of the intermediate layer 5 in the thickness direction, the graphite particles 1 may have, for example, a major axis diameter that is 4 times the thickness of the intermediate layer 5 or more, or a major axis diameter that is 2 times the thickness of the intermediate layer 5 or less. Thus, a current flowing in the in-plane direction of the intermediate layer during nail penetration is expected to be lowered.

The major axis diameter may be, for example, 1.5 μm or more, 5 μm or more, or 7 μm or more. The major axis diameter may be, for example, 20 μm or less or 10 μm or less.

The graphite particles 1 may have a spherical shape, a spheroidal shape, a clumped shape, a scaly shape, or the like. In the cross section of the intermediate layer 5 in the thickness direction, a ratio (aspect ratio) of the major axis diameter of the graphite particles 1 to the minor axis diameter of the graphite particles 1 may be 2 or more. Thus, a current flowing in the in-plane direction of the intermediate layer during nail penetration is expected to be lowered. This is thought to be caused by the fact that, when the aspect ratio is larger, the volume of the graphite particles 1 in the intermediate layer 5 is less, and the insulating particles 2 are likely to fill empty space. The aspect ratio may be, for example, 4 or more. The upper limit of the aspect ratio is not particularly limited. The aspect ratio may be, for example, 7 or less. Here, when the aspect ratio has a value after the decimal point, it is rounded to the nearest integer.

(Insulating Particles)

The intermediate layer 5 contains the insulating particles 2. In the intermediate layer 5, the insulating particles 2 have a higher mass proportion than the graphite particles 1. Thus, a current flowing in the in-plane direction of the intermediate layer during nail penetration is expected to be lowered. The intermediate layer 5 may contain, for example, 80 mass % or more and 95 mass % or less of the insulating particles 2, or 90 mass % or more and 95 mass % or less of the insulating particles 2.

The insulating particles 2 are not particularly limited. The insulating particles 2 may be, for example, at least one selected from the group including alumina (α-alumina), boehmite, titania, aluminum hydroxide, magnesium hydroxide, and aluminum nitride. The insulating particles 2 may have, for example, an average particle size of 0.2 μm to 2 μm. The "average particle size" in this specification refers to a particle size at which a cumulative volume from the side of fine particles is 50% of the total volume in a volume-based particle size distribution measured by a laser diffraction scattering method.

(Binder)

The intermediate layer 5 may further include a binder. The intermediate layer 5 may include, for example, 2 mass % or more and 10 mass % or less of the binder or 2 mass % or more and 3 mass % or less of the binder. The binder is not particularly limited. The binder may be, for example, at least one selected from the group including polyethylene (PE), polypropylene (PP), polyvinylidene fluoride (PVdF), polytetrafluoroethylene (PTFE), styrene butadiene rubber (SBR) and an ethylene-acrylic acid ester copolymer.

(Others)

The intermediate layer 5 may further include a component other than the above components. The intermediate layer 5 may further include, for example, a dispersant and an antistatic agent.

<Positive Electrode>

Figure 6:
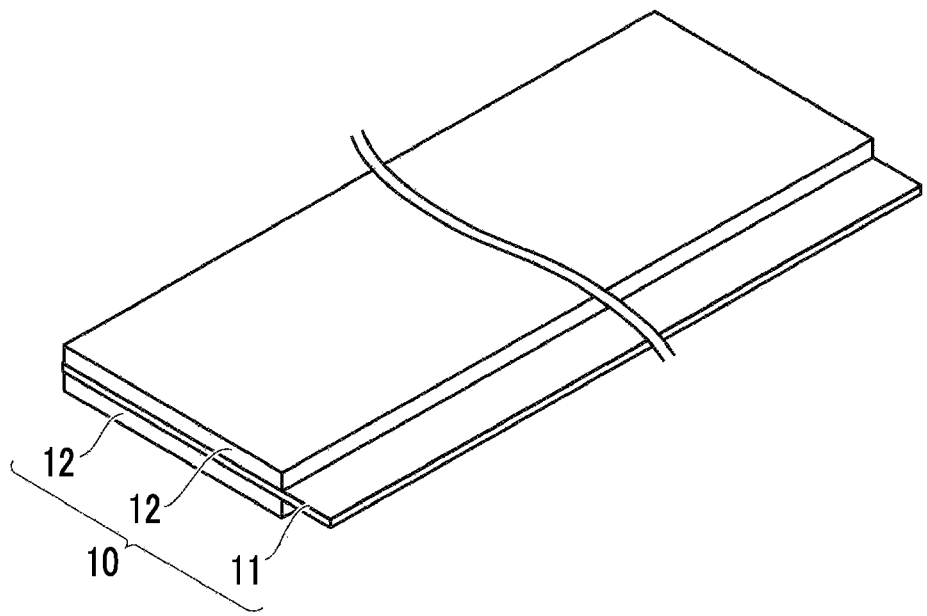
FIG. 6 is a schematic diagram showing an example of a configuration of a positive electrode of the present embodiment.

FIG. 6 is a schematic diagram showing an example of a configuration of a positive electrode of the present embodiment. The positive electrode 10 is a belt-like sheet. The positive electrode 10 includes the positive electrode current collector 11 and the positive electrode active material layer 12. As described above, the intermediate layer 5 can be interposed between the positive electrode current collector 11 and the positive electrode active material layer 12. The positive electrode 10 may include a part of the positive electrode current collector 11 that is exposed from the positive electrode active material layer 12 for a position at which the terminal 81 is connected.

The positive electrode current collector 11 may have, for example, a thickness of 10 μm to 30 μm. The positive electrode current collector 11 may be made of, for example, an Al foil. The Al foil may be a pure Al foil or an Al alloy foil.

The positive electrode active material layer 12 is formed on a surface of the intermediate layer 5 or a surface of the positive electrode current collector 11. The positive electrode active material layer 12 may have, for example, a thickness of 10 μm to 200 μm. The positive electrode active material layer 12 includes a positive electrode active material. The positive electrode active material layer 12 may include, for example, 80 mass % to 98 mass % of the positive electrode active material, and 1 mass % to 15 mass % of a conductive material with the remainder being made up of the binder.

The positive electrode active material is not particularly limited. The positive electrode active material may be, for example, $LiCoO_2$ particles, $LiNiO_2$ particles, $LiMnO_2$ particles, $LiNi_{1/3}Co_{1/3}Mn_{1/3}O_2$ particles, $LiNi_{0.82}Co_{0.15}Al_{0.03}O_2$ particles, $LiMn_2O_4$ particles, or $LiFePO_4$ particles. One type of positive electrode active material may be used alone or two or more types of positive electrode active material may be used in combination. The positive electrode active material may have, for example, an average particle size of 1 μm to 30 μm.

The conductive material is not particularly limited. The conductive material may be, for example, acetylene black (AB), thermal black, furnace black, graphite particles, vapor-grown carbon fibers (VGCF), or graphene flakes. One type of conductive material may be used alone or two or more types of conductive material may be used in combination.

The binder is not particularly limited. The binder may be, for example, PVdF, PTFE, polyacrylic acid (PAA), or carboxymethylcellulose (CMC). One type of binder may be used alone or two or more types of binder may be used in combination.

<Negative Electrode>

Figure 7:
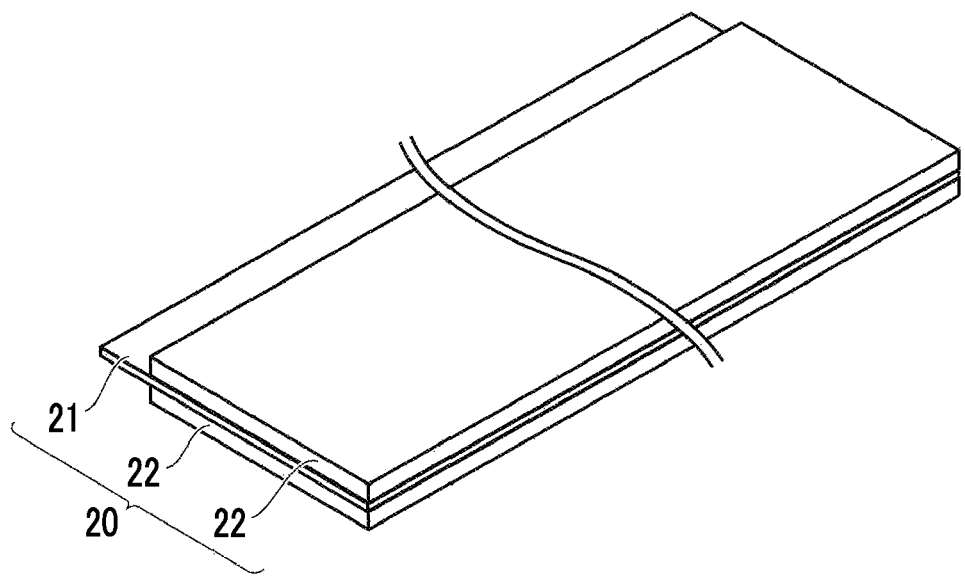
FIG. 7 is a schematic diagram showing an example of a configuration of a negative electrode of the present embodiment.

FIG. 7 is a schematic diagram showing an example of a configuration of a negative electrode of the present embodiment. The negative electrode 20 is a belt-like sheet. The negative electrode 20 includes the negative electrode current collector 21 and the negative electrode active material layer 22. As described above, the intermediate layer 5 can be interposed between the negative electrode current collector 21 and the negative electrode active material layer 22. The negative electrode 20 may have a part of the negative electrode current collector 21 that is exposed from the negative electrode active material layer 22 for a position at which the terminal 81 is connected.

The negative electrode current collector 21 may have, for example, a thickness of 5 μm to 30 μm. The negative electrode current collector 21 may be, for example, a copper (Cu) foil. The Cu foil may be a pure Cu foil or a Cu alloy foil.

The negative electrode active material layer 22 is formed on a surface of the intermediate layer 5 or a surface of the negative electrode current collector 21. The negative electrode active material layer 22 may have, for example, a thickness of 10 μm to 200 μm. The negative electrode active material layer 22 includes a negative electrode active material. The negative electrode active material layer 22 may include, for example, 90 mass % to 99.5 mass % of the negative electrode active material with the remainder being made up of the binder.

The negative electrode active material is not particularly limited. The negative electrode active material may be, for example, graphite particles, easily graphitizable carbon particles, non-graphitizable carbon particles, silicon particles, silicon oxide particles, tin particles, or tin oxide particles. The graphite particles may be made of artificial graphite or natural graphite. One type of negative electrode active material may be used alone or two or more types of negative electrode active material may be used in combination. The negative electrode active material may have, for example, an average particle size of 1 μm to 30 μm.

The binder is not particularly limited. The binder may be, for example, SBR, CMC, or PAA. One type of binder may be used alone or two or more types of binder may be used in combination.

<Separator>

The separator 30 is a belt-like sheet. The separator 30 may have, for example, a thickness of 10 μm to 50 μm. The separator 30 is an electrically insulating porous film. The separator 30 may be made of, for example, PE or PP. The separator 30 may have a multi-layer structure. The separator 30 may be formed by laminating, for example, a PP porous film, a PE porous film, and a PP porous film in that order.

The separator 30 may include a heat resistant layer on its surface (one surface or both surfaces). The heat resistant layer may have, for example, a thickness of 1 μm to 10 μm. The heat resistant layer includes a heat resistant material. The heat resistant material may be, for example, an oxide material (for example, alumina, boehmite, titania, and silica) or a resin material (polyimide, aramid). The heat resistant layer may further include a binder. The binder may be, for example, an ethylene-acrylic acid ester copolymer.

<Electrolyte Solution>

The electrolyte solution is a liquid electrolyte. The electrolyte solution contains a solvent and a lithium (Li) salt. The Li salt is dissolved in the solvent. The Li salt functions as a supporting electrolyte. The electrolyte solution may contain, for example, 0.5 mol/l to 2 mol/l of the Li salt. The Li salt may be, for example, $LiPF_6$, $LiBF_4$, $Li[N(FSO_2)_2]$, or Li[N ($CF_3SO_2)_2$]. One type of Li salt may be used alone or two or more types of Li salt may be used in combination.

The solvent is, for example, a solvent in which a cyclic carbonate and a chain carbonate are mixed. The mixing ratio may be, for example, "cyclic carbonate:chain carbonate=1:9 to 5:5" by volume ratio. As the cyclic carbonate, for example, ethylene carbonate (EC), propylene carbonate (PC), butylene carbonate (BC), and fluoroethylene carbonate (FEC) may be exemplified. As the chain carbonate, dimethyl carbonate (DMC), ethyl methyl carbonate (EMC), and diethyl carbonate (DEC) may be exemplified. One type of each of the cyclic carbonate and the chain carbonate may be used alone, or two or more types thereof may be used in combination.

The solvent may contain, for example, a lactone, a cyclic ether, a chain ether, and a carboxylic ester. As the lactone, for example, γ-butyrolactone (GBL) and δ-valerolactone may be exemplified. As the cyclic ether, for example, tetrahydrofuran (THF), 1,3-dioxolane, and 1,4-dioxane may be exemplified. As the chain ether, 1,2-dimethoxyethane (DME) and the like may be exemplified. As the carboxylic ester, for example, methyl formate (MF), methyl acetate (MA), and methyl propionate (MP) may be exemplified.

The electrolyte solution may include various functional additives in addition to the solvent and the Li salt. The electrolyte solution may include, for example, 1 mass % to 5 mass % of a functional additive. As the functional additive, for example, a gas generating agent (overcharge additive), and a film forming agent may be exemplified. As the gas generating agent, for example, cyclohexylbenzene (CHB) and biphenyl (BP) may be exemplified. As the film forming agent, for example, vinylene carbonate (VC), vinylethylene carbonate (VEC), $Li[B(C_2O_4)_2]$, $LiPO_2F_2$, propane sultone (PS), and ethylene sulfite (ES) may be exemplified.

Here, in the nonaqueous battery of the present embodiment, a gel electrolyte or a solid electrolyte may be used in place of the electrolyte solution. It is thought that an effect of preventing a short-circuit current will be obtained even if the electrolyte is a gel electrolyte or a solid electrolyte.

<Method of Producing Nonaqueous Battery>

Figure 8:
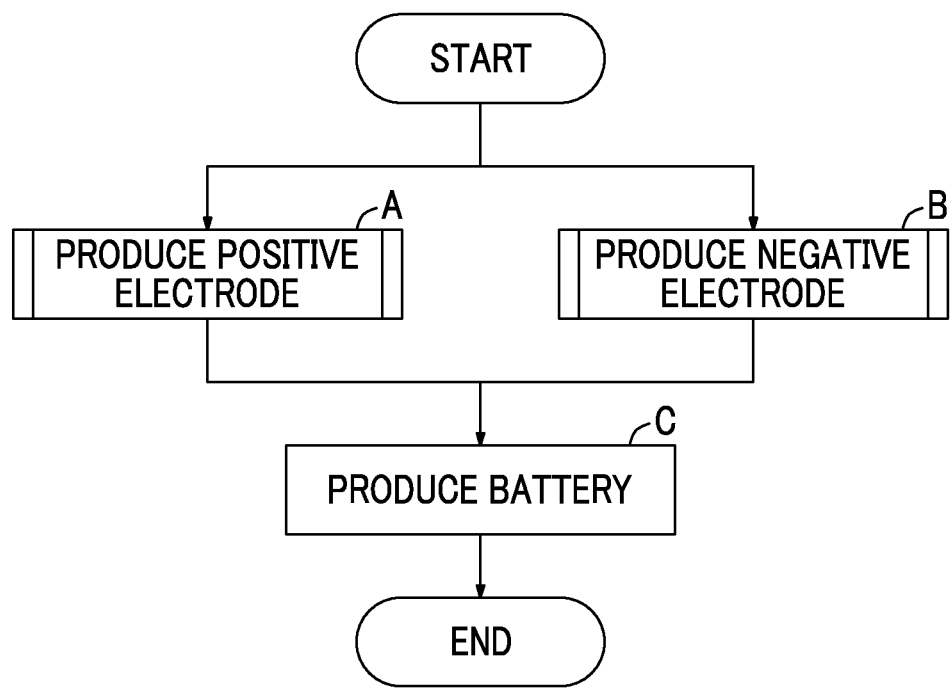
FIG. 8 is a flowchart showing an overview of a method of producing a nonaqueous battery of the present embodiment.

FIG. 8 is a flowchart showing an overview of a method of producing a nonaqueous battery of the present embodiment. The production method of the present embodiment includes "(A) producing a positive electrode," "(B) producing a negative electrode" and "(C) producing a battery."

Figure 9:
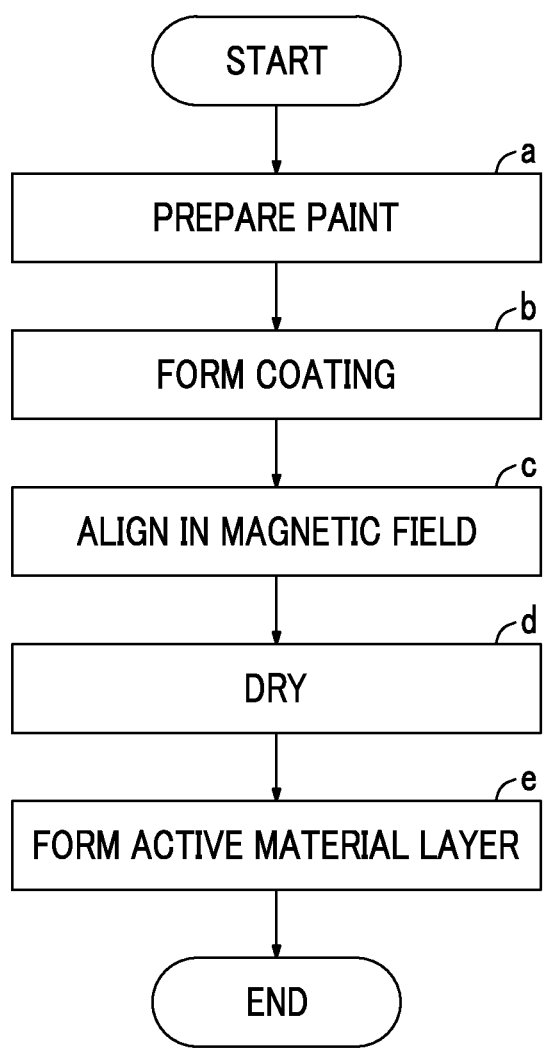
FIG. 9 is a flowchart showing an overview of a method of producing an electrode of the present embodiment.

FIG. 9 is a flowchart showing an overview of a method of producing an electrode of the present embodiment. At least one of "(A) producing a positive electrode" and "(B) producing a negative electrode" includes "(a) preparing a paint," "(b) forming a coating," "(c) aligning in a magnetic field," "(d) drying" and "(e) forming an active material layer."

<(A) Producing a Positive Electrode>

The production method of the present embodiment includes producing the positive electrode 10. Here, as an example, a case in which the intermediate layer 5 is formed between the positive electrode current collector 11 and the positive electrode active material layer 12 will be described.

<(a) Preparing a Paint>

Production of the positive electrode 10 includes preparing a paint containing the graphite particles 1 and the insulating particles 2. The paint is a precursor of the intermediate layer 5. For example, the graphite particles 1, the insulating particles 2, the binder, and the solvent are mixed together to prepare a paint. A general stirrer can be used for a mixing operation. Details of the graphite particles 1 and the like are as described above.

The solvent is appropriately selected according to a type of the binder. For example, when the binder is PVdF, N-methyl-2-pyrrolidone (NMP) can be used as the solvent.

The viscosity of the paint can be adjusted according to an amount of the solvent. The viscosity of the paint may be, for example, 10 mPa·s to 3,000 mPa·s, or 15 mPa·s to 1,000 mPa·s. Thus, the graphite particles 1 are likely to be aligned in a magnetic field and a desired XRD intensity ratio is expected to be obtained. The viscosity of the paint can be measured by a method according to "JISR 1652: viscosity measurement method using a rotational viscometer for a ceramic slurry." A measurement temperature may be 25° C. As the viscometer, a B type viscometer can be used.

<(b) Forming a Coating>

Production of the positive electrode 10 includes forming a coating by applying the paint to a surface of the positive electrode current collector 11. A coating method may be, for example, a micro gravure method. The micro gravure method is suitable for applying a paint with low viscosity. The coating can be formed to have, for example, a thickness of 1 μm to 10 μm.

<(c) Aligning in a Magnetic Field>

Figure 10:
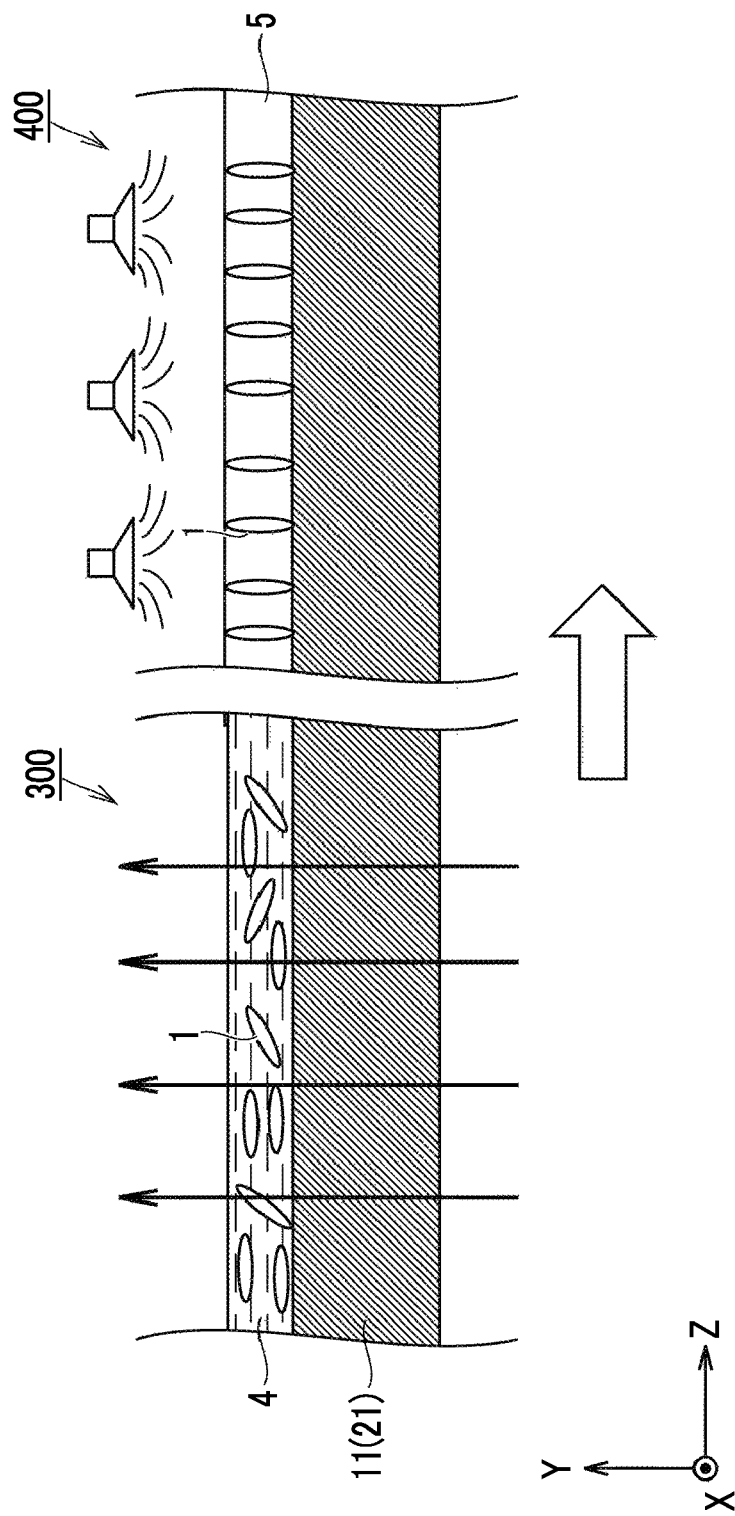
FIG. 10 is a conceptual sectional view for explaining aligning in a magnetic field and drying.

FIG. 10 is a conceptual sectional view for explaining aligning in a magnetic field and drying. Production of the positive electrode 10 includes aligning the graphite particles 1 by applying a magnetic field to the coating 4 in the thickness direction before a coating 4 is dried.

For example, the coating 4 may be passed through a space (a magnetic field space 300) to which a magnetic field is applied. Thereby, a magnetic field can be applied to the coating 4. In the present embodiment, the magnetic field is applied to the coating 4 in the thickness direction (a direction that is the thickness direction of the intermediate layer 5). Thereby, the graphite particles 1 can be aligned so that the basal plane is in the thickness direction of the coating 4. The magnetic field space 300 can be formed by, for example, a predetermined magnetic field generating device.

The alignment state (the XRD intensity ratio in the intermediate layer 5) of the graphite particles 1 can be adjusted using a magnetic flux density and an application time. The magnetic flux density may be 100 mT or more, 500 mT or more, or 750 mT or more. The magnetic flux density may be, for example, 1,000 mT or less or 800 mT or less. The magnetic flux density can be measured by, for example, a teslameter. For example, a "TGX-1000" (commercially available from Nihon Denji Sokki Co., Ltd.) or a product equivalent thereto can be used.

The application time can be adjusted using, for example, a speed at which the coating 4 passes through the magnetic field space 300. For example, when the magnetic flux density is 100 mT, the application time may be 5 seconds or longer. For example, when the magnetic flux density is 500 mT, the application time may be 1 second or longer. The application time may be, for example, 1 minute or shorter, 30 seconds or shorter, or 10 seconds or shorter.

<(d) Drying>

Production of the positive electrode 10 includes forming the intermediate layer 5 by drying the coating 4 in which the graphite particles 1 are aligned. For example, the coating 4 may be passed through a drying furnace 400. Thereby, the coating 4 can be dried. A drying method is not particularly limited. The coating 4 can be dried by, for example, hot air, infrared rays, or induction heating (IH). For example, when a windless method such as infrared rays is used, the XRD intensity ratio may be increased.

According to drying, the coating 4 can be cured while the graphite particles 1 are aligned. Thereby, the intermediate layer 5 is formed. In the present embodiment, in XRD measurement of the intermediate layer 5 by the out-of-plane method, the graphite particles 1 may be aligned so that a ratio of an intensity of the 110 diffraction line of a graphite crystal to an intensity of the 002 diffraction line of the graphite crystal is 0.0011 or more.

<(e) Forming an Active Material Layer>

Production of the positive electrode 10 includes forming the positive electrode active material layer 12 on a surface of the intermediate layer 5. For example, the positive electrode active material, the conductive material and the binder are mixed together to prepare a paint. Details of the positive electrode active material and the like are as described above. When the paint is applied to a surface of the intermediate layer 5 and dried, the positive electrode active material layer 12 can be formed. A coating method may be, for example, a slot die method. Accordingly, the positive electrode 10 can be produced.

Then, rolling may be performed so that the positive electrode active material layer 12 has a predetermined thickness. The positive electrode 10 can be cut into a predetermined shape (for example, a belt-like shape) according to specifications of the battery 100.

<(B) Producing a Negative Electrode>

The production method of the present embodiment includes producing the negative electrode 20. As described above, the negative electrode 20 may be produced so that it also includes the intermediate layer 5. That is, production of the negative electrode 20 may also include the above "(a) preparing a paint" to "(e) forming an active material layer."

For example, the negative electrode active material, the binder and the solvent are mixed together to prepare a paint. Details of the negative electrode active material and the like are as described above. When the paint is applied to a surface of the negative electrode current collector 21 and dried, the negative electrode active material layer 22 can be formed. A coating method may be, for example, a slot die method. Accordingly, the negative electrode 20 can be produced.

Then, rolling may be performed so that the negative electrode active material layer 22 has a predetermined thickness. The negative electrode 20 can be cut into a predetermined shape (for example, a belt-like shape) according to specifications of the battery 100.

<(C) Producing a Battery>

The production method of the present embodiment includes producing the battery 100 that includes at least the positive electrode 10 and the negative electrode 20.

For example, first, the electrode group 50 can be produced by laminating the positive electrode 10, the separator 30, the negative electrode 20 and the separator 30 in that order and additionally winding them in a spiral shape. After the winding, the electrode group 50 may be formed into a flat shape. For formation, for example, a flat press machine can be used.

The case 80 can be prepared. Details of the case 80 are as described above. The electrode group 50 is accommodated in the case 80. An electrolyte solution is injected into the case 80. Details of the electrolyte solution are as described above. The case 80 is sealed. Accordingly, the battery 100 can be produced.

Examples will be described below. However, the following examples do not limit the scope of the claims. In this specification, for example, a sample in which No. is marked with "*" such as "No. *1" is a comparative example. A sample in which No. is not marked with "*" such as "No. 1" is an example. In the following, the major axis diameter of the graphite particles or the like is a value measured in the cross-sectional SEM image of the intermediate layer by the above method.

<No. 1>

<(A) Producing a Positive Electrode>

<(a) Preparing a Paint>

The following materials were prepared.

Graphite particles: scaly graphite (major axis diameter: 5 µm, aspect ratio: 2)
Insulating particles: alumina
Binder: PVdF
Solvent: NMP Graphite particles, insulating particles, a binder and a solvent were mixed together to prepare a paint for an intermediate layer. A solid content of the paint was "graphite particles:insulating particles:binder=5:93:2" by mass proportion. That is, the insulating particles had a higher mass proportion than the graphite particles. The viscosity of the paint was 200 mP·s.

<(b) Forming a Coating>

As the positive electrode current collector, a belt-like Al foil was prepared. The Al foil had a thickness of 20 µm. The Al foil had a width of 130 mm (size in the X axis direction in FIG. 2). The paint for an intermediate layer was applied to a surface of the positive electrode current collector by a micro gravure method. Thereby, a coating with a thickness of 4 µm was formed. The coating was formed so that it had a width of 110 mm.

<(c) Aligning in a Magnetic Field>

The coating before drying was passed through a magnetic field space. That is, before the coating was dried, a magnetic field was applied to the coating in the thickness direction. Thereby, the graphite particles were assumed to be aligned. The magnetic flux density of the magnetic field was 500 mT. The application time was 5 seconds. The magnetic flux density here was a value measured by a "TGX-1000" (commercially available from Nihon Denji Sokki Co., Ltd.).

<(d) Drying>

The coating was passed through a drying furnace. That is, the coating in which the graphite particles were aligned was dried. Thereby, an intermediate layer was formed.

<(e) Forming an Active Material Layer>

The following materials were prepared.

Positive electrode active material: $LiNi_{1/3}Co_{1/3}Mn_{1/3}O_2$ particles
Conductive material: acetylene black (powdered product)
Binder: PVdF
Solvent: NMP A positive electrode active material, a conductive material, a binder, and a solvent were mixed together to prepare a paint for a positive electrode active material layer. A solid content of the paint was "positive electrode active material: conductive material:binder=90:8:2" by mass proportion. The paint for a positive electrode active material layer was applied to a surface of the intermediate layer and dried. Thereby, a positive electrode active material layer was formed on the surface of the intermediate layer. The positive electrode active material layer was formed so that it had an amount per unit area (mass per unit area) of 30 mg/cm$^2$.

When the above operations were also performed on the rear surface of the positive electrode current collector, the intermediate layer and the positive electrode active material layer were formed on both surfaces (both front and rear surfaces) of the positive electrode current collector. The positive electrode active material layer was rolled. Accordingly, the positive electrode was produced. At an end of the positive electrode in the width direction, the positive electrode current collector was exposed from the positive electrode active material layer over 20 mm.

<(B) Producing a Negative Electrode>

The following materials were prepared.
Negative electrode active material: natural graphite
Binder: CMC, SBR
Solvent: water (deionized water)
Negative electrode current collector: belt-like Cu foil (thickness: 10 μm, width: 135 mm)

A negative electrode active material, a binder and a solvent were mixed together to prepare a paint for a negative electrode active material layer. A solid content of the paint was "negative electrode active material:CMC:SBR=98:1:1" by mass proportion. The paint for a negative electrode active material was applied to surfaces (both front and rear surfaces) of the negative electrode current collector and dried. Thereby, a negative electrode active material layer was formed. The negative electrode active material layer was formed so that it had an amount per unit area of 15 mg/cm$^2$ and a width of 115 mm. The negative electrode active material layer was rolled. Accordingly, the negative electrode was produced. At an end of the negative electrode in the width direction, the negative electrode current collector was exposed from the negative electrode active material layer over 20 mm.

<(C) Producing a Battery>

A belt-like separator was prepared. The separator was a PE porous film. The separator had a thickness of 20 μm and a width of 120 mm. On a surface of the separator, a heat resistant layer with a thickness of 4 μm was formed. The heat resistant layer contained alumina (heat resistant material) and an ethylene-acrylic acid ester copolymer (binder).

The positive electrode, the separator, the negative electrode, and the separator were laminated in that order and additionally wound in a spiral shape. Accordingly, an electrode group was produced. An Al alloy case was prepared. The case had a height of 75 mm, a width of 160 mm, and a depth of 15 mm. The thickness of the case was 1 mm. The electrode group was accommodated in the case.

An electrolyte solution containing the following components was prepared.
Solvent: [EC:EMC:DEC=3:5:2]
Li salt: LiPF$_6$ (1 mol/l)

The electrolyte solution was injected into the case. The case was sealed. Thereby, a nonaqueous battery was produced. The nonaqueous battery was a rectangular lithium ion secondary battery. The nonaqueous battery was designed so that it had a rated capacity of 5 Ah.

<Nos. 2 to 4>

Batteries were produced in the same manner as in No. 1 except that graphite particles having the major axis diameter shown in the following Tables 1A and 1B were used in the intermediate layer.

<Nos. 5 and 6>

Batteries were produced in the same manner as in No. 1 except that the magnetic flux density was changed during aligning in the magnetic field as shown in the following Tables 1A and 1B.

<Nos. 7 to 9>

Batteries were produced in the same manner as in No. 1 except that graphite particles having the aspect ratio shown in the following Tables 1A and 1B were used in the intermediate layer.

<Nos. 10 and 11>

Batteries were produced in the same manner as in No. 1 except that a ratio of the major axis diameter of graphite particles to the thickness of the intermediate layer was changed as shown in the following Tables 1A and 1B.

<Nos. 12 and 13>

Batteries were produced in the same manner as in No. 1 except that the application time of the magnetic field was changed during aligning in the magnetic field as shown in the following Tables 1A and 1B.

<No. *1>

A battery was produced in the same manner as in No. 1 except that no intermediate layer was formed.

<No. *2>

A battery was produced in the same manner as in No. 1 except that graphite particles having the major axis diameter shown in the following Tables 1A and 1B were used in the intermediate layer.

<No. *3>

A battery was produced in the same manner as in No. 1 except that aligning in the magnetic field was not performed.

<No. *4>

A battery was produced in the same manner as in No. 1 except that acetylene black (powdered product) was used in place of graphite particles.

<Nos. *5 and *6>

Batteries were produced in the same manner as in No. 1 except that conditions for aligning in the magnetic field were changed as shown in the following Tables 1A and 1B.

<No. *7>

The following materials were prepared.
Positive electrode active material: LiNi$_{1/3}$Co$_{1/3}$Mn$_{1/3}$O$_2$ particles
Conductive material: scaly graphite (major axis diameter: 5 μm, aspect ratio: 2)
Binder: PVdF
Solvent: NMP A positive electrode active material, a conductive material, a binder, and a solvent were mixed together to prepare a paint for a positive electrode active material layer. A solid content of the paint was "positive electrode active material:conductive material:binder=90:8:2" by mass proportion. The paint for a positive electrode active material layer was directly applied to a surface of the positive electrode current collector. A magnetic field was applied to the coating in the thickness direction. Thereby, a conductive material (graphite particles) was assumed to be aligned. Then, when the coating was dried, a positive electrode active material layer was formed. The other procedures were performed in the same manner as in No. 1, and thus a battery was produced.

No. *7 was a sample in which no intermediate layer was formed and graphite particles were aligned in the active material layer.

<Evaluation>

1. XRD Intensity Ratio

The positive electrode active material layer was peeled off from the positive electrode. Thereby, the intermediate layer was exposed. XRD measurement of the intermediate layer and the positive electrode current collector (integrated structure) was performed by the out-of-plane method. An XRD intensity ratio was calculated by dividing an intensity of the 110 diffraction line of a graphite crystal by an intensity of the 002 diffraction line of the graphite crystal. The results are shown in the following Tables 1A and 1B. In the following Tables 1A and 1B, in No. *4, no diffraction pattern of the graphite crystal was obtained. The XRD intensity ratio of No. *7 was an XRD intensity ratio of the positive electrode active material layer.

2. Electrical Resistance (In-Plane Direction)

The positive electrode active material layer was peeled off from the positive electrode. Thereby, the intermediate layer was exposed. A cellophane tape was affixed to the intermediate layer. The intermediate layer was peeled off together with the cellophane tape. An integrated structure of the intermediate layer and the cellophane tape was cut so that it had a planar size of 10 cm×1 cm. Thereby, a belt-like sample was obtained. An AC resistance (1 kHz) between one end and the other end of the belt-like sample in the longitudinal direction was measured. The results are shown in the following Tables 1A and 1B.

3. Electrical Resistance (Thickness Direction)

The positive electrode active material layer was peeled off from the positive electrode. Thereby, the intermediate layer was exposed. An integrated structure of the intermediate layer and the positive electrode current collector was cut so that it had a planar size of 2 cm×2 cm. Thereby, a rectangular sample was obtained. In the same manner, an additional one rectangular sample was prepared. Two rectangular samples were laminated so that respective intermediate layers were in contact with each other and facing each other. An AC resistance (1 kHz) between the two positive electrode current collectors was measured. The results are shown in the following Tables 1A and 1B.

4. Battery Capacity

In a 25° C. environment, the battery was charged to 4.2 V by constant current type charging (current=5 A). The battery was discharged to 3.0 V by constant current type discharging (current=5 A) with a 5-minute pause therebetween. An initial discharging capacity was measured using the following constant current and constant voltage type charging (CCCV charging) and constant current and constant voltage type discharging (CCCV discharging) with an additional 5-minute pause therebetween.

CCCV charging: current during constant current=5 A, voltage during constant voltage=4.1 V, cut current=50 mA CCCV discharging: current during constant current=5 A, voltage during constant voltage=3.0 V, cut current=50 mA The results are shown in the column of "battery capacity" in the following Tables 1A and 1B. In No. *2, since the battery capacity was below a design value, the following nail penetration test was not performed.

5. Nail Penetration Test

A nail (tip R=1 mm) having a body diameter of 3 mm was prepared. The battery was fully charged. The nail penetration test was performed at a speed of 1 mm/s. An amount of voltage drop 1 second after the nail was stuck in was measured. The results are shown in the following Tables 1A and 1B. A smaller amount of voltage drop indicates a stronger effect of preventing a short-circuit current.

TABLE 1A

List of samples

Positive electrode

Intermediate layer

| No. | Thickness μm | Insulating particles | Conductive material | Major axis diameter μm | Aspect ratio | Major axis diameter/ thickness | Active material layer Conductive material |
|---|---|---|---|---|---|---|---|
| 1 | 5 | Alumina | Graphite particles | 7 | 2 | 1.4 | AB (powderd product) |
| 2 | 5 | Alumina | Graphite particles | 5 | 2 | 1.0 | AB (powderd product) |
| 3 | 5 | Alumina | Graphite particles | 10 | 2 | 2.0 | AB (powderd product) |
| 4 | 5 | Alumina | Graphite particles | 20 | 2 | 4.0 | AB (powderd product) |
| 5 | 5 | Alumina | Graphite particles | 7 | 2 | 1.4 | AB (powderd product) |
| 6 | 5 | Alumina | Graphite particles | 7 | 2 | 1.4 | AB (powderd product) |
| 7 | 5 | Alumina | Graphite particles | 7 | 1 | 1.4 | AB (powderd product) |
| 8 | 5 | Alumina | Graphite particles | 7 | 4 | 1.4 | AB (powderd product) |
| 9 | 5 | Alumina | Graphite particles | 7 | 7 | 1.4 | AB (powderd product) |
| 10 | 3 | Alumina | Graphite particles | 5 | 2 | 1.7 | AB (powderd product) |
| 11 | 1 | Alumina | Graphite particles | 1.5 | 2 | 1.5 | AB (powderd product) |
| 12 | 5 | Alumina | Graphite particles | 7 | 2 | 1.4 | AB (powderd product) |
| 13 | 5 | Alumina | Graphite particles | 7 | 2 | 1.4 | AB (powderd product) |
| *1 | — | — | — | — | — | — | AB (powderd product) |
| *2 | 5 | Alumina | Graphite particles | 3 | 2 | 0.6 | AB (powderd product) |
| *3 | 5 | Alumina | Graphite particles | 7 | 2 | 1.4 | AB (powderd product) |
| *4 | 5 | Alumina | AB (powderd product) | — | — | — | AB (powderd product) |
| *5 | 5 | Alumina | Graphite particles | 7 | 2 | 1.4 | AB (powderd product) |
| *6 | 5 | Alumina | Graphite particles | 7 | 2 | 1.4 | AB (powderd product) |
| *7 | — | — | — | — | — | — | Graphite particles |

TABLE 1B

List of samples

| | Aligning in magnetic field | | Evaluation | | | Amount of voltage drop one second after nail was stuck in V | Battery capacity Ah |
|---|---|---|---|---|---|---|---|
| | | | XRD | Electrical resistance | | | |
| No. | Magnetic flux density mT | Application time Seconds | intensity ratio | In-plane direction mΩ | Thickness direction mΩ | | |
| 1 | 500 | 5 | 0.0024 | 8,500 | 10 | 0.2 | 5 |
| 2 | 500 | 5 | 0.0029 | 9,000 | 11 | 0.18 | 5 |
| 3 | 500 | 5 | 0.0018 | 7,000 | 9 | 0.24 | 5 |
| 4 | 500 | 5 | 0.0012 | 5,000 | 5 | 0.29 | 5 |
| 5 | 100 | 5 | 0.0011 | 5,000 | 5 | 0.3 | 5 |

TABLE 1B-continued

List of samples

| | Aligning in magnetic field | | Evaluation | | Amount of voltage drop one second after nail was stuck in V | Battery capacity Ah |
|---|---|---|---|---|---|---|
| | Mag- | | Electrical resistance | | | |
| No. | netic flux density mT | Appli- cation time Seconds | XRD intensity ratio — | In-plane direction mΩ | Thick- ness direction mΩ | | |
| 6 | 800 | 5 | 0.0035 | 10,000 | 13 | 0.16 | 5 |
| 7 | 500 | 5 | 0.0018 | 7,000 | 10 | 0.22 | 5 |
| 8 | 500 | 5 | 0.0029 | 9,500 | 10 | 0.19 | 5 |
| 9 | 500 | 5 | 0.0034 | 11,000 | 10 | 0.15 | 5 |
| 10 | 500 | 5 | 0.0024 | 8,500 | 8 | 0.2 | 5 |
| 11 | 500 | 5 | 0.0024 | 8,500 | 5 | 0.2 | 5 |
| 12 | 500 | 1 | 0.0013 | 5,000 | 7 | 0.3 | 5 |
| 13 | 500 | 10 | 0.0025 | 8,700 | 11 | 0.19 | 5 |
| *1 | — | — | — | 10 | 15 | 1 | 5 |
| *2 | 500 | 5 | 0.0024 | 10,000 | 700 | — | 3.2 |
| *3 | — | — | 0.0002 | 350 | 10 | 0.55 | 5 |
| *4 | 500 | 5 | — | 250 | 10 | 0.6 | 5 |
| *5 | 50 | 5 | 0.0008 | 500 | 10 | 0.5 | 5 |
| *6 | 500 | 0.5 | 0.0005 | 500 | 10 | 0.55 | 5 |
| *7 | 500 | 5 | 0.0024 | 10 | 15 | 1 | 5 |

<Results>

Nos. 1 to 13 having the intermediate layer had a smaller amount of voltage drop (that is, a short-circuit current was prevented) than No. *1 having no intermediate layer. This is thought to have been caused by the fact that the exposure of the positive electrode current collector was prevented by the intermediate layer and a current flowing in the intermediate layer in the in-plane direction was low.

In No. *2, a battery capacity was insufficient. This is thought to have been caused by the fact that, since the major axis diameter of graphite particles was smaller than the thickness of the intermediate layer, conduction between the positive electrode active material layer and the positive electrode current collector was insufficient.

In No. *3, alignment of graphite particles in the magnetic field was not performed. Thus, the electrical resistance of the intermediate layer in the in-plane direction was low. As a result, prevention of a short-circuit current was thought to have been insufficient.

In No. *4, prevention of a short-circuit current was insufficient. Imparting anisotropy of electrical resistance to the intermediate layer was thought not to have been possible in acetylene black (carbon black).

In No. *5 and No. *6, prevention of a short-circuit current was insufficient. In No. *5 and No. *6, the XRD intensity ratio was less than 0.0011. That is, graphite particles were not sufficiently aligned. Thus, a current flowed in the intermediate layer in the in-plane direction and prevention of a short-circuit current was thought to have been insufficient.

In No. *7, prevention of a short-circuit current was insufficient. This is thought to have been caused by the fact that, even if graphite particles were aligned in the positive electrode active material layer, a current flowing in the in-plane direction at an interface between the positive electrode active material layer and the positive electrode current collector was not prevented.

Based on the results of Nos. 1, and 7 to 9, it was found that, when the aspect ratio of graphite particles was 2 or more, an effect of preventing a short-circuit current became stronger.

Based on the results of Nos. 1 to 4, it was found that, when graphite particles had a major axis diameter that is twice the thickness of the intermediate layer or less, an effect of preventing a short-circuit current became stronger.

Based on the results of Nos. 1 to 13, it was found that, when the XRD intensity ratio was 0.0018 or more, an effect of preventing a short-circuit current became stronger.

Based on the results of Nos. 1 to 13, it was found that, when the XRD intensity ratio was 0.0029 or more, an effect of preventing a short-circuit current became stronger.

In Nos. 1, and 10 and 11, even when the thicknesses of the intermediate layers were different, amounts of voltage drop were almost constant. This is thought to have been caused by the fact that, in Nos. 1, and 10 and 11, alignment states of graphite particles and electrical resistances in the in-plane direction were substantially the same.

The above embodiments and examples are only examples, and should not be considered as restrictive. The technical scope defined by the scope of the claims includes meanings equivalent to the scope of the claims and all modifications within the scope of the claims.

What is claimed is:

1. A nonaqueous battery comprising:
a positive electrode; and
a negative electrode,
wherein at least one of the positive electrode and the negative electrode includes a current collector, an intermediate layer, and an active material layer containing an electrode active material, a binder, and a conductive material,
the intermediate layer is interposed between the current collector and the active material layer,
the intermediate layer includes graphite particles and insulating particles,
the intermediate layer contains 3% mass or more and 10% mass or less of the graphite particles,
the conductive material in the active material layer is contained only in the active material layer,
in a cross section of the intermediate layer in a thickness direction, a major axis diameter of the graphite particles is equal to or greater than a thickness of the intermediate layer, and
in X-ray diffraction measurement of the intermediate layer by an out-of-plane method, a ratio of an intensity of an 110 diffraction line of a graphite crystal to an intensity of a 002 diffraction line of the graphite crystal is 0.0011 or more and 0.01 or less.

2. The nonaqueous battery according to claim 1, wherein, in the cross section of the intermediate layer in the thickness direction, a ratio of the major axis diameter of the graphite particles to a minor axis diameter of the graphite particles is 2 or more.

3. The nonaqueous battery according to claim 1, wherein, in the cross section of the intermediate layer in the thickness direction, the major axis diameter of the graphite particles is twice the thickness of the intermediate layer or less.

4. The nonaqueous battery according to claim 1, wherein, in the X-ray diffraction measurement of the intermediate layer by the out-of-plane method, the ratio of the intensity of the 110 diffraction line of the graphite crystal to the intensity of the 002 diffraction line of the graphite crystal is 0.0018 or more.

5. The nonaqueous battery according to claim 1, wherein, in the X-ray diffraction measurement of the intermediate layer by the out-of-plane method, the ratio of the intensity of the 110 diffraction line of the graphite crystal to the intensity of the 002 diffraction line of the graphite crystal is 0.0029 or more.

6. The nonaqueous battery according to claim 1, wherein, in the intermediate layer, a mass proportion of the insulating particles is higher than a mass proportion of the graphite particles.

7. A nonaqueous battery comprising:
a positive electrode; and
a negative electrode,
wherein at least one of the positive electrode and the negative electrode includes a current collector, an intermediate layer, and an active material layer containing an electrode active material, a binder, and a conductive material,
the intermediate layer is interposed between the current collector and the active material layer,
the intermediate layer includes graphite particles and insulating particles,
the intermediate layer contains 3% mass or more and 10% mass or less of the graphite particles,
the conductive material in the active material layer is contained only in the active material layer,
in a cross section of the intermediate layer in a thickness direction of the intermediate layer, a length of the graphite particles in the thickness direction is equal to or greater than a thickness of the intermediate layer,
in an in-plane direction perpendicular to the thickness direction, the insulating particles are disposed between the graphite particles,
a plurality of insulating particles are continuously disposed between the current collector and the active material layer, and
in X-ray diffraction measurement of the intermediate layer by an out-of-plane method, a ratio of an intensity of an 110 diffraction line of a graphite crystal to an intensity of a 002 diffraction line of the graphite crystal is 0.0011 or more and 0.01 or less.

8. A method of producing a nonaqueous battery according to claim 1, the method comprising:
producing a positive electrode;
producing a negative electrode; and
producing a nonaqueous battery that includes at least the positive electrode and the negative electrode,
wherein at least one of producing the positive electrode and producing the negative electrode includes
preparing a paint including graphite particles and insulating particles,
forming a coating by applying the paint to a surface of a current collector,
aligning the graphite particles by applying a magnetic field to the coating in a thickness direction before the coating is dried,
forming an intermediate layer by drying the coating in which the graphite particles are aligned, and
forming an active material layer on a surface of the intermediate layer, and
in X-ray diffraction measurement of the intermediate layer by an out-of-plane method, a ratio of an intensity of an 110 diffraction line of a graphite crystal to an intensity of a 002 diffraction line of the graphite crystal is 0.0011 or more and 0.01 or less.

9. The method according to claim 8, wherein a viscosity of the paint is 10 mPa·s to 3,000 mPa·s.

10. The nonaqueous battery according to claim 1, wherein, the thickness of the intermediate layer is 1 to 5 μm.

11. The nonaqueous battery according to claim 1, wherein, the major axis diameter is 1.5 to 20 μm.

12. The nonaqueous battery according to claim 7, wherein, the thickness of the intermediate layer is 1 to 5 μm.

13. The nonaqueous battery according to claim 7, wherein, the major axis diameter is 1.5 to 20 μm.

14. The nonaqueous battery according to claim 1, wherein, the graphite particles are each in contact with a surface of the current collector and a surface of the active material layer.

15. The nonaqueous battery according to claim 7, wherein, the graphite particles are each in contact with a surface of the current collector and a surface of the active material layer.

16. The nonaqueous battery according to claim 7, wherein, in the X-ray diffraction measurement of the intermediate layer by the out-of-plane method, the ratio of the intensity of the 110 diffraction line of the graphite crystal to the intensity of the 002 diffraction line of the graphite crystal is 0.0011 or more and 0.0034 or less.

17. The nonaqueous battery according to claim 1, wherein, the graphite particles are aligned in a direction substantially perpendicular to a surface of the current collector.

18. The nonaqueous battery according to claim 7, wherein, the graphite particles are aligned in a direction substantially perpendicular to a surface of the current collector.

19. The nonaqueous battery according to claim 7, wherein, in the intermediate layer, a mass proportion of the insulating particles is higher than a mass proportion of the graphite particles.

* * * * *